US012387045B2

(12) United States Patent
Sethi et al.

(10) Patent No.: US 12,387,045 B2
(45) Date of Patent: Aug. 12, 2025

(54) METHOD AND SYSTEM TO MANAGE TECH SUPPORT INTERACTIONS USING DYNAMIC NOTIFICATION PLATFORM

(71) Applicant: EMC IP Holding Company LLC, Hopkinton, MA (US)

(72) Inventors: Parminder Singh Sethi, Ludhiana (IN); Akanksha Goel, Faridabad (IN); Shelesh Chopra, Bangalore (IN); Priyansh Saxena, Bareilly (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 441 days.

(21) Appl. No.: 17/385,771

(22) Filed: Jul. 26, 2021

(65) Prior Publication Data

US 2022/0398383 A1 Dec. 15, 2022

(30) Foreign Application Priority Data

Jun. 11, 2021 (IN) .............................. 202141026080

(51) Int. Cl.
*G06F 40/30* (2020.01)
*G06F 16/3329* (2025.01)
(Continued)

(52) U.S. Cl.
CPC .......... *G06F 40/30* (2020.01); *G06F 16/3329* (2019.01); *G06F 16/3344* (2019.01);
(Continued)

(58) Field of Classification Search
CPC .. G06F 40/30; G06F 16/3329; G06F 16/3344; G06F 40/205; G06F 40/253; G06F 40/279; G06F 40/25
(Continued)

(56) References Cited

U.S. PATENT DOCUMENTS 6,697,962 B1  2/2004  Mccrory
7,698,131 B2  4/2010  Bennett
(Continued)

FOREIGN PATENT DOCUMENTS

CA  2568137 A1  2/2007
CA  2793743 A1  7/2011
(Continued)

OTHER PUBLICATIONS

Anonymous, Cloud-Based Contact Center Market Next Big Thing / Major Giants Five9, CloudTalk, Talkdesk, Year: 2021, NA, M2 Presswire (3 pages).
(Continued)

*Primary Examiner* — George C Monikang
(74) *Attorney, Agent, or Firm* — Chamberlain, Hrdlicka, White, Williams & Aughtry; Aly Z. Dossa

(57) ABSTRACT

In general, embodiments relate to a method for managing a technical support (TS) session on a technical support system. The embodiments include receiving TS correspondence from a client, wherein the TS correspondence is associated with the TS session, classifying the TS correspondence to assign it a question classification, based on the question classification, making a determination that the TS correspondence matches at least one prior received TS correspondence, wherein the at least one prior received TS correspondence is associated with the TS session, and visually identifying the TS correspondence and the at least one prior received TS correspondence on a graphical customer interface (GUI) of the technical support system.

14 Claims, 5 Drawing Sheets

(51) Int. Cl.
- *G06F 16/334* (2025.01)
- *G06F 16/35* (2019.01)
- *G06F 40/205* (2020.01)
- *G06F 40/253* (2020.01)
- *G06F 40/279* (2020.01)

(52) U.S. Cl.
CPC ............ *G06F 16/35* (2019.01); *G06F 40/205* (2020.01); *G06F 40/253* (2020.01); *G06F 40/279* (2020.01)

(58) Field of Classification Search
USPC .................................... 704/8, 231, 239, 251
See application file for complete search history.

(56) References Cited

U.S. PATENT DOCUMENTS

| | | |
|---|---|---|
| 7,970,720 B1 | 6/2011 | Heidenreich et al. |
| 8,577,016 B1 | 11/2013 | Duva et al. |
| 9,602,560 B1 | 3/2017 | Moody |
| 9,754,263 B1 | 9/2017 | Apple |
| 9,922,649 B1 | 3/2018 | Lore et al. |
| 10,048,996 B1 | 8/2018 | Bell et al. |
| 10,192,179 B1 | 1/2019 | Agarwal |
| 10,410,219 B1 | 9/2019 | El-Nakib |
| 10,721,142 B1 | 7/2020 | Mathur et al. |
| 10,956,822 B1 | 3/2021 | Kern et al. |
| 11,436,642 B1 | 9/2022 | Podgorny et al. |
| 11,461,787 B1 | 10/2022 | Riley |
| 11,561,849 B1 | 1/2023 | Kairali et al. |
| 12,154,118 B1 | 11/2024 | Khmelev |
| 2001/0047270 A1 | 11/2001 | Gusick et al. |
| 2002/0022986 A1 | 2/2002 | Coker et al. |
| 2003/0041088 A1 | 2/2003 | Wilson |
| 2004/0162724 A1 | 8/2004 | Hill et al. |
| 2005/0105712 A1 | 5/2005 | Williams et al. |
| 2006/0010110 A1 | 1/2006 | Kim et al. |
| 2006/0080107 A1 | 4/2006 | Hill et al. |
| 2007/0276631 A1 | 11/2007 | Subramanian et al. |
| 2008/0091829 A1 | 4/2008 | Spataro |
| 2008/0152122 A1 | 6/2008 | Idan et al. |
| 2009/0083246 A1 | 3/2009 | Coker et al. |
| 2009/0228264 A1 | 9/2009 | Williams et al. |
| 2010/0050074 A1* | 2/2010 | Nachmani ............. G06F 40/232 715/257 |
| 2011/0055122 A1 | 3/2011 | Andreoli |
| 2011/0071869 A1 | 3/2011 | Obrien et al. |
| 2011/0118932 A1 | 5/2011 | Singh et al. |
| 2011/0320228 A1 | 12/2011 | Kowalski |
| 2012/0102371 A1 | 4/2012 | Tonouchi |
| 2012/0185290 A1 | 7/2012 | Mueller |
| 2013/0110520 A1 | 5/2013 | Cheyer et al. |
| 2013/0268260 A1 | 10/2013 | Lundberg et al. |
| 2014/0067375 A1 | 3/2014 | Wooters |
| 2014/0281739 A1 | 9/2014 | Tuffs |
| 2014/0282257 A1 | 9/2014 | Nixon |
| 2014/0324276 A1 | 10/2014 | Weaks |
| 2014/0324651 A1 | 10/2014 | Piepenbrink |
| 2014/0337377 A1* | 11/2014 | de Assuncao .. G06Q 10/063114 707/770 |
| 2014/0344565 A1 | 11/2014 | Wu |
| 2015/0088784 A1 | 3/2015 | Dhara et al. |
| 2015/0127322 A1 | 5/2015 | Clark |
| 2015/0180985 A1 | 6/2015 | Seibert |
| 2015/0193429 A1 | 7/2015 | Bohra et al. |
| 2015/0278534 A1 | 10/2015 | Thiyagarajan |
| 2015/0310445 A1 | 10/2015 | Chan et al. |
| 2016/0027019 A1 | 1/2016 | Michaelangelo et al. |
| 2016/0055044 A1 | 2/2016 | Kawai et al. |
| 2016/0132812 A1 | 5/2016 | Beasley et al. |
| 2016/0171505 A1 | 6/2016 | Johri et al. |
| 2016/0179928 A1 | 6/2016 | Alkov et al. |
| 2016/0335252 A1 | 11/2016 | Brunet et al. |
| 2016/0371756 A1 | 12/2016 | Yokel |
| 2017/0011308 A1 | 1/2017 | Sun et al. |
| 2017/0060995 A1 | 3/2017 | Boule et al. |
| 2017/0068976 A1 | 3/2017 | Wawrzynowicz |
| 2017/0109222 A1 | 4/2017 | Singh et al. |
| 2017/0132060 A1 | 5/2017 | Nomura et al. |
| 2017/0169325 A1 | 6/2017 | Mccord et al. |
| 2017/0230312 A1 | 8/2017 | Barrett et al. |
| 2017/0244809 A1 | 8/2017 | Chae |
| 2017/0270419 A1 | 9/2017 | Sánchez Charles et al. |
| 2017/0350403 A1 | 12/2017 | Kelly et al. |
| 2018/0007204 A1 | 1/2018 | Klein |
| 2018/0012229 A1 | 1/2018 | Roberts |
| 2018/0012231 A1 | 1/2018 | Sapoznik et al. |
| 2018/0095814 A1 | 4/2018 | Patil |
| 2018/0121929 A1 | 5/2018 | Cheng |
| 2018/0129785 A1* | 5/2018 | Pal ........................ A61B 5/0002 |
| 2018/0174020 A1 | 6/2018 | Wu |
| 2018/0191903 A1 | 7/2018 | Yokel |
| 2018/0278687 A1 | 9/2018 | Handa |
| 2018/0285320 A1 | 10/2018 | Yang et al. |
| 2018/0322509 A1 | 11/2018 | Walthers et al. |
| 2018/0329768 A1 | 11/2018 | Bikumala et al. |
| 2018/0349394 A1 | 12/2018 | Hu |
| 2019/0108270 A1 | 4/2019 | Dunne et al. |
| 2019/0163594 A1 | 5/2019 | Hayden et al. |
| 2019/0196682 A1 | 6/2019 | Madafferi |
| 2019/0228107 A1 | 7/2019 | Trim et al. |
| 2019/0228296 A1 | 7/2019 | Gefen et al. |
| 2019/0228315 A1 | 7/2019 | Xu et al. |
| 2019/0236132 A1 | 8/2019 | Zhu et al. |
| 2019/0268470 A1 | 8/2019 | Amir et al. |
| 2019/0340249 A1 | 11/2019 | Connell |
| 2019/0349321 A1 | 11/2019 | Cai et al. |
| 2019/0355042 A1 | 11/2019 | Swierk et al. |
| 2020/0013070 A1 | 1/2020 | Walthers et al. |
| 2020/0027094 A1 | 1/2020 | Consalvo et al. |
| 2020/0117531 A1 | 4/2020 | Sudharsana |
| 2020/0133755 A1 | 4/2020 | Bansal et al. |
| 2020/0184355 A1 | 6/2020 | Mehta |
| 2020/0218492 A1 | 7/2020 | Farivar |
| 2020/0240875 A1 | 7/2020 | Venkateswaran et al. |
| 2020/0302018 A1 | 9/2020 | Turkkan et al. |
| 2020/0311738 A1 | 10/2020 | Gupta et al. |
| 2020/0364638 A1 | 11/2020 | Molloy et al. |
| 2021/0103703 A1 | 4/2021 | Galitsky |
| 2021/0109832 A1 | 4/2021 | Ladkani |
| 2021/0136195 A1 | 5/2021 | Adibi et al. |
| 2021/0157985 A1 | 5/2021 | Rotkop et al. |
| 2021/0208971 A1 | 7/2021 | Srinivasan |
| 2021/0209635 A1 | 7/2021 | Czajka et al. |
| 2021/0264438 A1 | 8/2021 | Singh |
| 2021/0319189 A1 | 10/2021 | Trehan |
| 2021/0357598 A1 | 11/2021 | Li |
| 2022/0019935 A1 | 1/2022 | Ghatage et al. |
| 2022/0036175 A1 | 2/2022 | Krishnamurthy et al. |
| 2022/0050733 A1 | 2/2022 | Selvaraju |
| 2022/0066791 A1 | 3/2022 | Drury |
| 2022/0067746 A1 | 3/2022 | Thakkar |
| 2022/0068263 A1 | 3/2022 | Roy |
| 2022/0094789 A1 | 3/2022 | Lau et al. |
| 2022/0129257 A1 | 4/2022 | Touati et al. |
| 2022/0172079 A1 | 6/2022 | Kalandyk et al. |
| 2022/0172222 A1 | 6/2022 | Chin et al. |
| 2022/0197725 A1 | 6/2022 | Liu |
| 2022/0208188 A1 | 6/2022 | Yoffe et al. |
| 2022/0215273 A1 | 7/2022 | Sethi et al. |
| 2022/0308943 A1 | 9/2022 | Srinivasan et al. |
| 2022/0394348 A1 | 12/2022 | Hatambeiki et al. |
| 2022/0398383 A1 | 12/2022 | Sethi et al. |
| 2022/0400060 A1 | 12/2022 | Sethi et al. |
| 2023/0047346 A1 | 2/2023 | Daniel et al. |
| 2023/0053913 A1 | 2/2023 | De Souza et al. |
| 2023/0073644 A1 | 3/2023 | Thakkar et al. |
| 2023/0120510 A1 | 4/2023 | Sesha |

(56) References Cited

U.S. PATENT DOCUMENTS

| | | |
|---|---|---|
| 2023/0132116 A1 | 4/2023 | Sethi et al. |
| 2024/0187836 A1 | 6/2024 | Ball |

FOREIGN PATENT DOCUMENTS

| | | |
|---|---|---|
| CA | 3052174 A1 | 2/2020 |
| CA | 3206778 A1 | 8/2022 |
| CA | 2867335 C | 9/2023 |
| CN | 105493446 A | 4/2016 |
| CN | 113127746 A | 7/2021 |
| EP | 1873699 A1 | 1/2008 |
| EP | 1602102 B1 | 12/2010 |
| WO | 9858356 A2 | 12/1998 |
| WO | 2009087489 A1 | 7/2009 |
| WO | 2013151808 A1 | 10/2013 |
| WO | 2014043623 A1 | 3/2014 |
| WO | 2021050170 A1 | 3/2021 |

OTHER PUBLICATIONS

Caporuscio Mauro et al., Smart-troubleshooting connected devices: Concept, challenges and opportunities, Future Generation Computer Systems, Elsevier Science Publishers. Amsterdam, NL, vol. 111. Sep. 16, 2019, pp. 681-697 [retrieved on Sep. 16, 2019]. (17 pages).

Dhoolia, A cognitive system for business and technical support: A case study, Year: 2017, pp. 74-85, vol. 61, No. 1, paper 7 (12 pages).

International Search Report and Written Opinion mailed May 8, 2023 for corresponding PCT Application No. PCTUS2023010749 filed Jan. 13, 2023 (14 pages).

Law, An Integrated Case-Based Reasoning Approach for Intelligent Help Desk Fault Management, Year: 1997, pp. 265-274, vol. 13, No. 4 (10 pages).

Shannon Keown, What Call Center Location is Right for Your? (& Considerations), Sep. 1, 2021 (9 pages).

Unknown, Multi-Site Contact Centers—Can they work for your business?, May 13, 2021(3 pages).

Mark Granger, "ServiceNow products and services explained", https://web/archive.org/web/20210420101531/https://www.nelsonfrank.com/insights/servicenow-products-services-explained <accessed date Aug. 12, 2022>, 10 pages.

Walid Maalej et al., Using contexts similarity to predict relationships between tasks, Year: 2017, pp. 267-284, The Journal of Systems and Software (18 pages).

Anonymous, "Retailcustomerexperience.com—Network Media Group: 5 best practices for building the omnichannel customer service strategy", Newstex Entrepreneurship Blogs, 2019 (Year: 2019), pp. 1-2.

Anonymous, "Chongqing Centre Service Outsourcing Ind Files Chinese Patent Application for Call Center Service Management System", Global IP News.Information Technology Patent News, 2020 (Year: 2020).

D. Hoogeveen et al., "Detecting misflagged duplicate questions in community question-answering archives", 12th International AAAI Conference on Web and Social Media, ICWSM 2018 (Year: 2018).

T. E. Workman et al., "Rethinking information delivery: using a natural language processing application for point- of-care data discovery [dagger]", Journal of the Medical Library Association, vol. 100, (2), pp. 113-120, 2012 (Year: 2012).

Ranchal R. et al, Protection of identity information in cloud computing without trusted third party, In 2010 29th IEEE symposium on reliable distributed systems, pp. 368-372, 2010 (5 pages).

Robbes Romain et al., Using contexts similarity to predict relationships, Using contexts similarity to predict relationships, unknown, 18 pages. 2017.

Robbes Romain et al, Using contexts similarity to predict relationships, The Journal of Systems and Software, 18 pages, 2017.

\* cited by examiner

| | | |
|---|---|---|
| Time 1 | Customer | Global Protect VPN not working? |
| Time 2 | TSP | Thanks for reaching out to the tech support. How may I help you? |
| Time 3 | Customer | I am unable to connect to Global Protect VPN. |
| Time 4 | TSP | Hello Priyansh. I understand you are unable to login to global protect. |
| Time 5 | TSP | What is the error when logging in? |
| Time 6 | Customer | I do not see any error logs but it shows "Unable to connect". Can you please tell me how to connect with the VPN? |
| Time 7 | TSP | What is your username? |
| Time 8 | Customer | priyansh_saxena |
| Time 9 | TSP | Ok, I checked your account and see there are no issues with your account. |
| Time 10 | Customer | But I am unable to connect to Global Protect VPN. Why? |
| Time 11 | TSP | Send me a screenshot of the page you are on in Global Protect. |
| Time 12 | Customer | [Shares the screenshot] |
| Time 13 | TSP | Ok, checked and see there are no issues with the account or password. |
| Time 14 | Customer | But my VPN is not connecting? What should I do? |
| Time 15 | TSP | What's the error? |
| Time 16 | Customer | It's not accepting my password and shows authentication failed. |
| Time 17 | TSP | Ok, I have created a ticket for the same. The concerned team will reach out to you. |

FIG. 3B

__METHOD AND SYSTEM TO MANAGE TECH SUPPORT INTERACTIONS USING DYNAMIC NOTIFICATION PLATFORM__

BACKGROUND

Once computing systems are deployed, customers of these computing systems often encounter issues with the operation of these computing systems. The customers typically try to solve these issues internally, but when they cannot resolve these issues, they often contact technical support to assist them in solving the issues with their computing systems.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3B shows an exemplary visual stream in accordance with one or more embodiments of the invention

DETAILED DESCRIPTION

Figure 1:
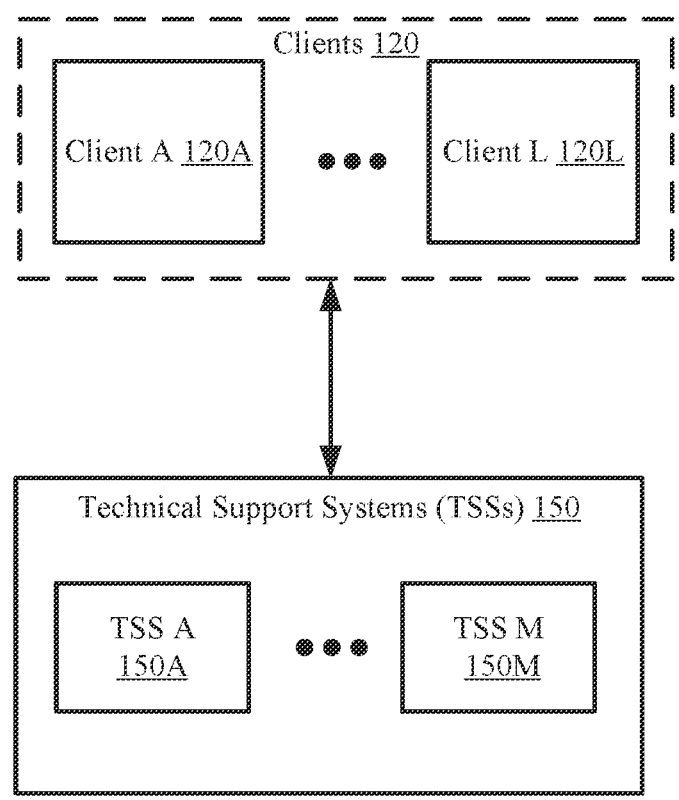
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate to a method and system providing real-time or near real-time visual feedback to technical support personnel (TSPs) during a technical support (TS) session. More specifically, embodiments of the invention provide the TSP with a visual stream of the conversation between the TSP and the customer, where duplicative portions of the conversation are visually linked (e.g., they are highlighted with the same color). By visually linking (or visually identifying) duplicative portions of the conversation, the TSP may be able to readily determine that the customer is stuck at a given point in technical support process. Once this point of friction is identified, the TSP may then be able to redirect the conversation to illicit additional information from the customer, so that the customer may move past this point in the technical support process and resolve their technical support issue.

FIG. 1 shows a system in accordance with one or more embodiments of the invention.

The system includes one or more clients (120) and one or more technical support systems (TSSes) (150). The system may include additional, fewer, and/or different components without departing from the invention. Each component may be operably connected to any of the other components via any combination of wired and/or wireless connections. Each component illustrated in FIG. 1 is discussed below.

The customer may determine that it needs to contact a TSP to address a technical support issue. The technical support issue may be on a client (120) that the customer is using or on another device (not shown) that the customer is using. The technical support issue may be any issue that prevents (or impairs) that customer's ability to access and/or use: (i) the client, (ii) another device (which may be logical or physical), any applications, and/or functionality of the client, and/or another device.

In one or more embodiments of the invention, the clients (120) correspond to devices (which may be physical or logical, as discussed below) that the customer is using to interact with the TSSes (150). In one or more embodiments of the invention, each client (120A, 120L) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client (120A, 120L) described throughout this application.

In one or more embodiments of the invention, each client (120A, 120L) is implemented as a logical device. The logical device may utilize the computing resources of any number of computing devices, and thereby provide the functionality of the client (120A, 120L) described throughout this application.

In one or more embodiments of the invention, each of the TSSes (150) is a system used by a TSP to interact with the customers (via the clients (120)) in order to resolve technical support issues. The TSSes (150) provide the functionality of the described throughout this application and/or all, or a portion thereof, of the methods illustrated in FIG. 3A.

Figure 4:
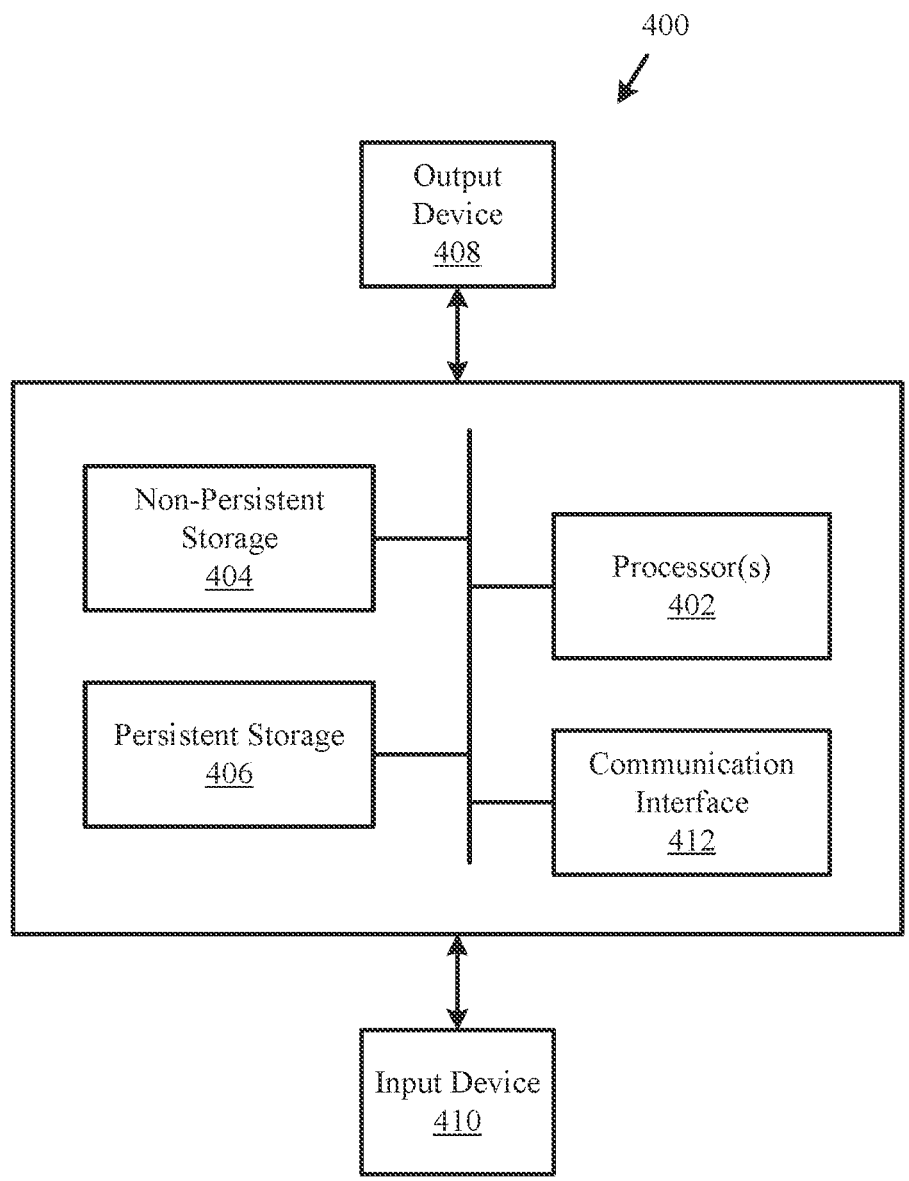
FIG. 4 shows a diagram of a computing device in accordance with one or more embodiments of the invention.

In one or more embodiments of the invention, the TSSes (150, 150A, 150M) are implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the TSSes (150) described throughout this application.

In one or more embodiments of the invention, the TSSes (150) are implemented as a logical device. The logical device may utilize the computing resources of any number of computing devices and thereby provide the functionality of the TSSes (150) described throughout this application. Additional detail about the TSSes (150) are provided in FIG. 2 below.

Figure 2:
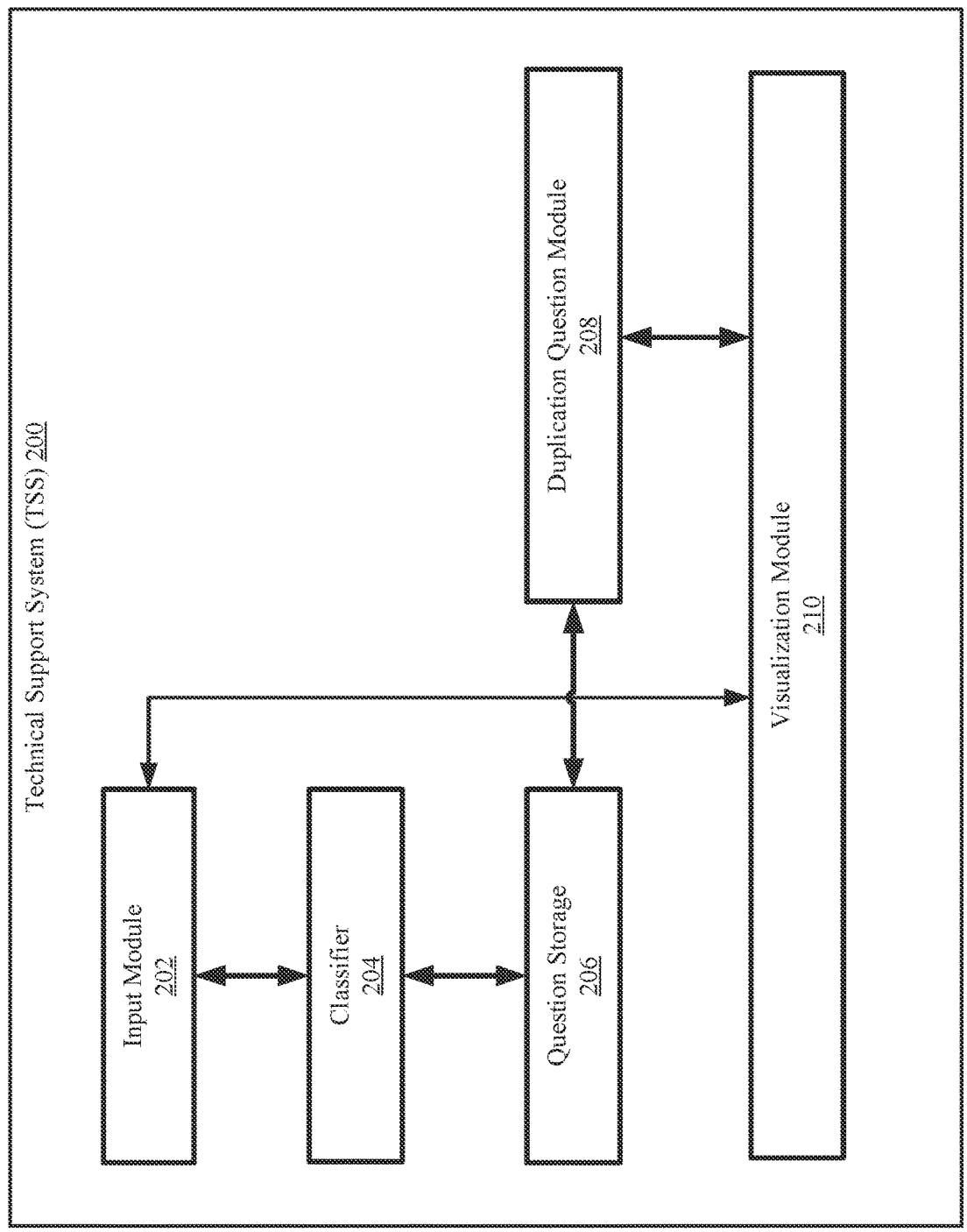
FIG. 2 shows a technical support system in accordance with one or more embodiments of the invention.

FIG. 2 shows a technical support system with one or more embodiments of the invention. The TSS (200) includes an input module (202), a classifier (204), a question storage (206), a duplication question module (208), and a visualization module (210). Each of these components is described below.

In one embodiment of the invention, the input module (202) is any hardware, software, or any combination thereof that includes functionality to receive TS correspondence(s). The TS correspondence corresponds to a question, answer, or any other communication that is generated by the customer and sent to the TSP as part of a technical support session. Examples of TS correspondences are provided in FIG. 3A below.

In one embodiment of the invention, the TS correspondence may be received in the form of (i) digital audio data, (ii) text corresponding to a transcription of an audio signal (regardless of the type of audio signal), and/or text generated by a customer and sent via a client to the TSS.

In one embodiment of the invention, TS correspondence are generated on the client by encoding an audio signal in a digital form and then converting the resulting digital audio data into one or more TS correspondences. The conversion of the digital audio data into one or more TS correspondences, may include applying an audio codec to the digital audio data, to compress the digital audio data prior to generating the TS correspondences. The use of the audio codec may enable a smaller number of TS correspondences to be sent to the TSS.

In one embodiment of the invention, the audio signal may be obtained from a customer speaking into a microphone on the client. Alternatively, the audio signal may correspond to a pre-recorded audio signal that the customer provided to the client using conventional methods. In other embodiments of the invention, the client may receive the digital audio data directly instead of receiving an analog audio signal. In other embodiments of the invention, the audio signal may be computer generated.

In one embodiment of the invention, the audio signal includes one or more audio utterances. An audio utterance corresponds to a unit of speech bounded by silence. The utterance may be a word, a clause, a sentence, or multiple sentences. A text utterance corresponds to a unit of speech (in text form) that is provided by a user or system, where the unit of speech may be a word, a clause, a sentence, or multiple sentences. Embodiments of the invention apply to both types of utterances. Further, unless otherwise specified, "utterance" means either an audio utterance, a text utterance, or a combination thereof.

In one embodiment of the invention, when the TS correspondence is an audio signal, then the input module (202) includes functionality to convert the audio signal into text using any known or later discovered speech-to-text conversion application (which may be implemented in hardware, software, or any combination thereof).

While the input module (202) may receive TS correspondences from the client in any format, the result of the processing of the received TS correspondences is a text format of the TS correspondences. The text format of the TS correspondences may then be used by the other components in the TSS.

In one embodiment of the invention, once the TS correspondence is converted into a text format, the TS correspondence may be cleaned. Cleaning the TS correspondence may include identifying and correcting grammatical and/or punctuation mistakes. For example, the TS correspondence: "I does not see any error logs but it show "Unable to connect". Can you please tell me how to connect with the VPN", is corrected to "I do not see any error logs but it shows "Unable to connect". Can you please tell me how to connect with the VPN."

While not required, by cleaning the TS correspondences prior to passing the TS correspondences to other components in the TSS, the other components in the TSS may be able to more accurately process the TS correspondences to determine whether there are duplicate TS correspondences.

In one embodiment of the invention, the classifier (204) includes functionality to classify the TS correspondence as: (i) imperative (i.e., a question), (ii) declarative (i.e., a statement), or (iii) imperative (i.e., a command). The classifier may be trained using TS correspondence from other TS sessions and/or using any other known or later discovered natural language processing (NLP) model(s). The classifier may be obtained from any source and may be trained using any form of training data. Further, the classifier may be periodically updated as there are improvements in the NLP model(s), and/or the NLP model(s) are trained using more appropriate training data. The classifier (204) may be implemented using hardware, software, or any combination thereof.

In one embodiment of the invention, the question storage (206) corresponds to any type of volatile or non-volatile (i.e. persistent) storage device that includes functionality to store TS correspondence that is classified as an imperative (i.e., classified as a question) by the classifier (202). The question storage (206) may store the TS correspondence, and the corresponding reply(replies), from the TSP related to the TS correspondence.

For example, consider a scenario in which the following TS correspondence is received by the TSS:
Customer: "I do not see any error logs but it shows "Unable to connect". Can you please tell me how to connect with the VPN."
In response to this TS correspondence, the TSP replies:
TSP: "Ok, I checked your account and see there are no issues with your account."
In this example, the TS correspondence from the customer is classified as a question and then it is stored in the question storage. Further, the response from the TSP may also be stored in the question storage and associated with the aforementioned TS correspondence.

In addition to storing the TS correspondence and the TSP's reply(replies), the question storage may also store information that identifies the TS session, and a time stamp(s) for the TS correspondence, and TSP reply(replies). In one embodiment of the invention, the TS correspondences (and, if stored, the associated TSP replies) are stored on a per-TS session basis.

The question storage may maintain the TS correspondence and the TSP's reply(replies) for the duration of the TS session with which they are associated. Once the TS session ends, all TS correspondences (and, if stored, the associated TSP replies) are removed from the question storage. Alternatively, the TS correspondences (and, if stored, the associated TSP replies) are maintained (or exported) and then used to train (or update the training of) the classifier (204) and/or the duplicate question module (208).

In one embodiment of the invention, the duplication question module (208) includes functionality to determine whether a given TS correspondence is duplicative of a prior received TS correspondence(s). For example, the duplication question model may indicate that the following questions are duplicative (with varying confidence levels):
Customer: "Global Protect VPN not working?"
Customer: "Can you please tell me how to connect with the VPN?"
Customer: "But I am unable to connect to Global Protect VPN Why?"
Customer: "But my VPN is not connecting? What should I do?"

The duplication question module (208) may be implemented using hardware, software, or any combination thereof. The duplication question module may be trained using TS correspondence from other TS sessions and/or using any other known or later discovered natural language processing (NLP) model(s). The duplication question module may be obtained from any source and may be trained using any form of training data. Further, the duplication question module may be periodically updated as there are improvements in the NLP model(s) and/or the NLP model(s) are trained using more appropriate training data.

The duplication question module (208) may include functionality to determine whether a pair of TS correspondences (i.e., the TS correspondence that was most recently received and a prior received TS correspondence). The duplication question module may perform the duplication analysis on the TS correspondence that was most recently received and all (or at least a portion) of the prior received TS correspondences for the TS session. The result of processing of the received TS correspondence is an identification of zero, one, or more pairs of duplicative TS correspondences.

In one embodiment of the invention, the duplication question module (208), generates values for one or more input parameters for a given pair of TS correspondences for a TS session, and then uses them as input into a Light Gradient Boosting Machine. The result of processing the aforementioned input values using the Light Gradient Boosting Machine is a binary result, which indicates whether or not the two TS correspondences are duplicative (i.e., similar to each other).

In one embodiment of the invention, once a pair of TS correspondences are determined to be duplicates by the duplication question module, the question storage may be updated to indicate that the pair of TS correspondences are duplicative. By tracking the duplicative TS correspondences, the TSS may be able to more efficiently identify sets of related TS correspondences.

For example, consider a scenario in which the customer sends Q1 at Time (T) 1 and Q2 at T2 and the duplication question module determines that Q1 and Q2 are duplicative. Following this determination, the customer sends Q3 at T3; if the question storage is tracking that Q1 and Q2 are duplicative, then, if the duplication question module determines that Q3 is duplicative of Q1, then it will not need to check if Q3 is duplicative of Q2. Since the duplication question module has already determined that Q1 is duplicative of Q2 then, as such, Q3 is deemed to also be duplicative of Q2 even though no independent comparison of Q2 and Q3 is performed by the duplication question module.

The duplication question module (208) may be implemented using hardware, software, or any combination thereof.

In one embodiment of the invention, the visualization module (210) includes functionality to: (i) receive TS correspondences (or cleaned TS correspondences), and corresponding TSP replies, and display the aforementioned content on a graphical user interface (GUI) of the TSS as a visual stream (e.g., FIG. 3B) that is ordered by time; and (ii) visually indicate (highlight or link) duplicative TS correspondence within the visual stream, and/or in a separate window(s) on the GUI (e.g., one per set of duplicative questions). In one embodiment of the invention, the visualization module may not modify the visual stream of the TS session; rather, the visualization module concurrently displays one or more separate windows in the GUI that show the duplicative TS correspondences and the corresponding TSP reply(replies).

In one embodiment of the invention, if the TSP is concurrently handling multiple TS sessions, then the visualization module may perform the aforementioned functionality of a per-TS session basis.

The visualization module (210) may be implemented using hardware, software, or any combination thereof.

Figure 3A:
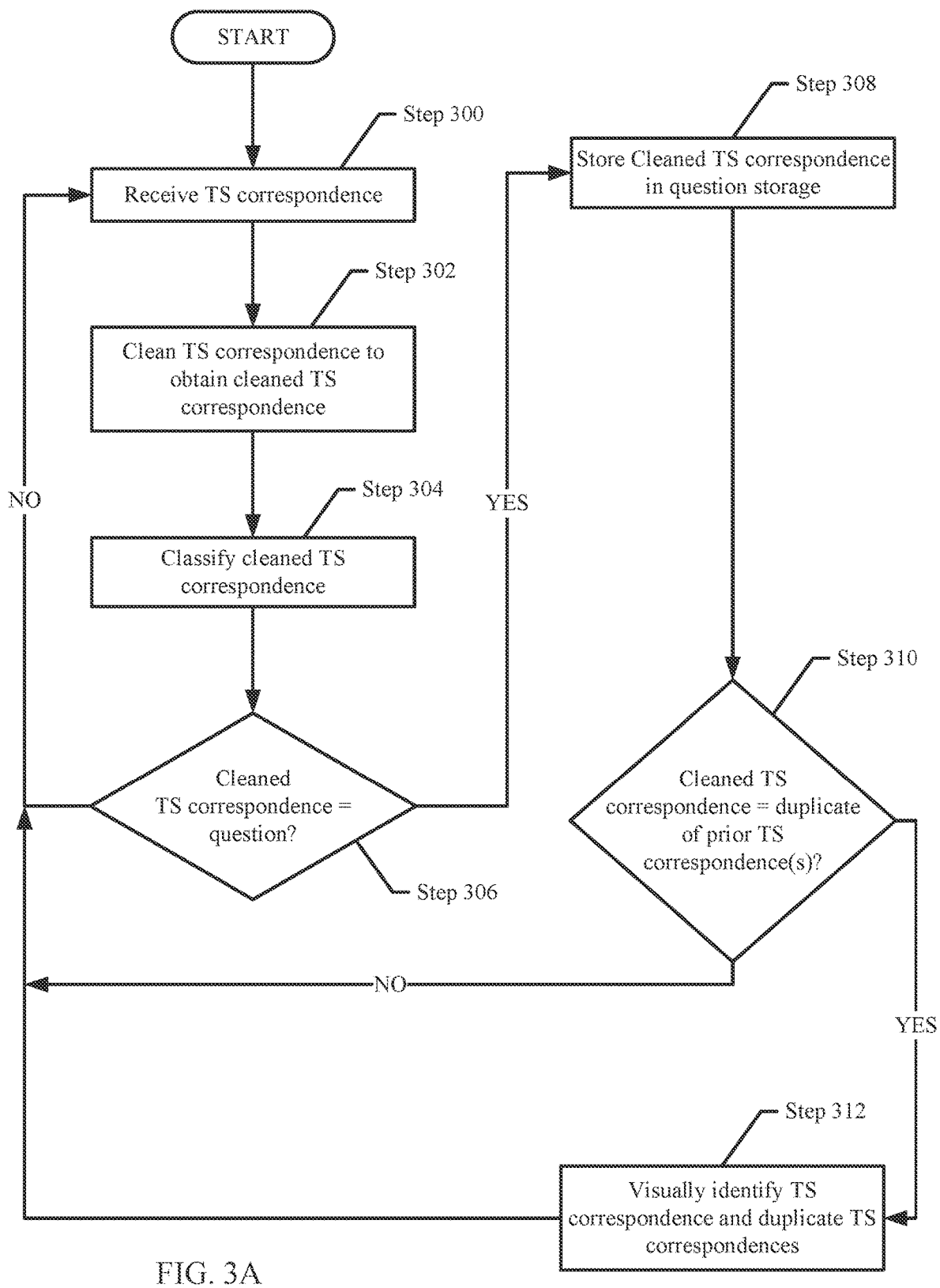
FIG. 3A shows a method to detect duplicate questions in a technical support session and provide visual feedback based on the detection system in accordance with one or more embodiments of the invention.

FIG. 3A shows a flowchart of a method in accordance with one or more embodiments of the invention. The method depicted in FIG. 3A may be performed to detect duplicate questions in a technical support session and provide visual feedback based on the detection. The method shown in FIG. 3A may be performed by, for example, a technical support system (e.g., 200, FIG. 2). Other components of the system in FIG. 1 or 2 may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, TS correspondence, as part of a TS session, is received from a customer (via a client) by the input module and, as necessary, converted into a text format. In one embodiment of the invention, a TS session starts when the customer (via the client) sends a TS correspondence to a TSP, and ends when either the customer or the TSP ends the TS session (e.g., by the customer not sending TS correspondences for a pre-determined period of time, by the customer or TSP, closing a communication session, etc.).

In step 302, the TS correspondence is cleaned to obtain cleaned TS correspondence. Though not shown in FIG. 3A, once the TS correspondence is cleaned (or after the TS correspondence is received if no cleaning is required or performed), it is provided to the visualization module to display as part of a visual stream on a GUI of the TSS.

In step 304, the TS correspondence (which may or more not be cleaned) is classified using the classifier to obtain a classification, which may be a question classification (i.e., a classification that indicates that the TS correspondence is a question), or a non-question classification (i.e., one or more classifications that indicate the TS correspondence is not a question, e.g., it is a command or a statement).

In step 306, a determination is made about whether the TS correspondence (which may or more not be cleaned) is classified as a question. If the TS correspondence (which may or more not be cleaned) is classified as a question, the process proceeds to step 308; otherwise, the process proceeds back to step 300 to await receipt of the next TS correspondence to process.

In step 308, the TS correspondence (which may or more not be cleaned) is stored in the question storage. Though not shown in FIG. 3A, once the aforementioned TS correspondence is stored in the question storage, the corresponding TSP replies, are also stored in the question storage and linked (or otherwise associated with the appropriate TS correspondence).

In step 310, the TS correspondence (which may or more not be cleaned) is then processed by the duplication question module, to determine whether the aforementioned TS correspondence is duplicative of any of the prior TS correspondences for the TS session stored in the question storage. If the aforementioned TS correspondence is duplicative of any of the prior TS correspondences for the TS session, then the question storage is updated to reflect this determination, and then the process proceeds to step 312.

In step 312, the visualization module visually links the TS correspondence from step 300, with the one or more identified prior TS correspondences for the TS session determined in step 310. Step 312 may include modifying the visual stream in real-time or near real-time once the determination is made that the TS correspondence received in step 300 is duplicative of one or prior TS correspondences for the TS session. In another embodiment of the invention, the TS correspondence may not be added to the visual stream until it has been processed through step 312. Said another way, the TS correspondence is not added to the visual stream until the processing in step 304-312 has been performed.

In one embodiment of the invention, the TS correspondence from step 300, and a prior TS correspondence, are visually linked by highlighting both TS correspondences in the same color. If the TS correspondence from step 300 is duplicative of multiple prior TS correspondences, then all of the TS correspondences may be highlighted with the same color. However, if the TS correspondence from step 300 is determined to be duplicative of a prior set of identified duplicative TS correspondences, then TS correspondence from step 300 is highlighted in the same color, as was previously used, to visually link the prior set of identified duplicative TS correspondences. The invention is not limited to the aforementioned visual linking.

Once step 312 is completed, the process proceeds back to step 300 to await receipt of the next TS correspondence to process.

FIG. 3B shows an exemplary visual stream in accordance with one or more embodiments of the invention. In the example shown in FIG. 3B, the visual stream includes TS correspondences (time (T) 1, T3, T6, T8, T10, T12, T14, T16) and corresponding TSP replies (T2, T4, T5, T7, T9, T11, T13, T15, T17). In this example, the visual stream is for a TS session that starts at T1 and ends at T17 (i.e., the TSP ends the TS session).

At T1, the customer sends a TS Correspondence ("Global Protect VPN not working"), which is displayed in the visual stream. The TSS determines that the TS Correspondence is a question (Q1) and stores Q1 in the question storage. As this is the first question in the question storage, there is no processing by the duplication question module. The TSP relies at T2, where the reply is stored with Q1 in the question storage.

At T3-T5, there is additional TS correspondence and TSP replies exchanged, but there are no questions in the TS correspondence received from the customer; thus, this content is only displayed in the visual stream.

At T6, the customer sends a TS Correspondence ("I do not see any error logs but it shows "Unable to connect". Can you please tell me how to connect with the VPN?"), which is displayed in the visual stream. The TSS determines that the TS Correspondence is a question (Q2) and stores Q2 in the question storage. As this is the second question in the question storage, there is processing by the duplication question module. The processing by the duplication module results in a determination that Q1 and Q2 are duplicative. In response to this determination, the visualization module highlights Q1 and Q2 in the visual stream. The TSP relies at T7, where the reply is stored with Q2 in the question storage.

At T8-T9, there is additional TS correspondence and TSP replies exchanged, but there are no questions in the TS correspondence received from the customer; thus, this content is only displayed in the visual stream.

At T10, the customer sends a TS Correspondence ("But I am unable to connect to Global Protect VPN. Why?"), which is displayed in the visual stream. The TSS determines that the TS Correspondence is a question (Q3) and stores Q3 in the question storage. As this is the third question in the question storage, there is processing by the duplication question module. The processing by the duplication module results in a determination that Q1 and Q3 are duplicative. In response to this determination, the visualization module highlights Q3 in the visual stream with the same color as Q1 and Q2 (which was previously identified as duplicative of Q1). The TSP replies at T11, where the reply is stored with Q3 in the question storage.

At T12-T13, there is additional TS correspondence and TSP replies exchanged, but there are no questions in the TS correspondence received from the customer; thus, this content is only displayed in the visual stream.

At T14, the customer sends a TS Correspondence ("But my VPN is not connecting? What should I do?"), which is displayed on in the visual stream. The TSS determines that the TS Correspondence is a question (Q4) and stores Q4 in the question storage. As this is the fourth question in the question storage, there is processing by the duplication question module. The processing by the duplication module results in a determination that Q3 and Q4 are duplicative. In response to this determination, the visualization module highlights Q4 in the visual stream with the same color as Q1, Q2, and Q3 (which was previously identified as duplicative of Q1 and Q2). The TSP replies at T15, where the reply is stored with Q4 in the question storage.

At T16-T17, there is additional TS correspondence and TSP replies exchanged, but there are no questions in the TS correspondence received from the customer; thus, this content is only displayed in the visual stream. At T17, the TSP ends the TS session.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive, or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores, or micro-cores, of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve technical support personnel review and utilization of the visual stream in a technical support session. More specifically, embodiments of the invention reduce the operational cost of customer communication with technical support personnel. Specifically, embodiments of the invention aim to reduce the length of time that customers need to interact with technical support personnel, by providing technical support personnel, with visual indications of the relationships (e.g., duplicative questions) between the various questions that the customers are asking. By identifying the duplicative questions, the technical support personnel can readily determine, based on the presence of duplication questions, how to guide the conversation (which may be audio or text) to answer the question in a different way so that the customer is satisfied with the answer. By reducing the number of duplicative questions, the time that the customer is interacting with the technical support personnel may be reduced.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A method for managing a technical support (TS) session on a technical support system, the method comprising:

receiving TS correspondence from a client, wherein the TS correspondence is received from the client during a TS session;

classifying, by a classifier, the TS correspondence to assign it a question classification, wherein the classifier classifies to the question classification, a statement classification, or a command classification using a natural language processing model;

storing the TS correspondence in a question storage when the TS correspondence has the question classification;

based on the question classification, making a determination that the TS correspondence received during the TS session matches at least one prior received TS correspondence, wherein the at least one prior received TS correspondence is associated with the same TS session;

visually identifying the TS correspondence and the at least one prior received TS correspondence from the client on a graphical customer interface (GUI) of a technical support system, wherein the TS correspondence and the at least one prior received TS correspondence are highlighted to distinguish from other TS correspondences displayed in the GUI that do not match the at least one prior received TS correspondence;

receiving a second TS correspondence from the client, wherein the second TS correspondence is associated with the TS session;

classifying the second TS correspondence to assign it to a statement classification; and based on the statement classification, not storing the second TS correspondence in the question storage, wherein the question storage is used to train the classifier.

2. The method of claim 1, wherein the TS correspondence comprises text based on audio input obtained from the client.

3. The method of claim 1, wherein the TS correspondence comprises text obtained via a chat session from the client.

4. The method of claim 3, wherein prior to classifying the TS correspondence, the text obtained via the chat session is cleaned to obtain cleaned TS correspondence, wherein classifying the TS correspondence uses the cleaned TS correspondence.

5. The method of claim 4, wherein cleaning the TS correspondence comprises modifying at least a portion of the text to address at least one grammatical error.

6. A technical support (TS) system, comprising:
a processor;
wherein the TS system is configured to:
receive TS correspondence from a client, wherein the TS correspondence is received from the client during a TS session;
classify, by a classifier, the TS correspondence to assign it a question classification, wherein the classifier classifies to the question classification, a statement classification, or a command classification using a natural language processing model;
store the TS correspondence in a question storage when the TS correspondence has the question classification;
based on the question classification, make a determination that the TS correspondence received during the TS session matches at least one prior received TS correspondence, wherein the at least one prior received TS correspondence is associated with the same TS session; and
visually identify the TS correspondence and the at least one prior received TS correspondence from the client on a graphical customer interface (GUI) of a technical support system, wherein the TS correspondence and the at least one prior received TS correspondence are highlighted to distinguish from other TS correspondences displayed in the GUI that do not match the at least one prior received TS correspondence
receive a second TS correspondence from the client, wherein the second TS correspondence is associated with the TS session;
classify the second TS correspondence to assign it to a statement classification; and
based on the statement classification, not store the second TS correspondence in the question storage, wherein the question storage is used to train the classifier.

7. The technical support system of claim 6, wherein the TS correspondence comprises text based on audio input obtained from the client.

8. The technical support system of claim 6, wherein the TS correspondence comprises text obtained via a chat session from the client.

9. The technical support system of claim 8, wherein prior to classifying the TS correspondence, the text obtained via the chat session is cleaned to obtain cleaned TS correspondence, wherein classifying the TS correspondence uses the cleaned TS correspondence.

10. The technical support system of claim 9, wherein cleaning the TS correspondence comprises modifying at least a portion of the text to address at least one grammatical error.

11. A non-transitory computer readable medium comprising computer readable program code to:
receive TS correspondence from a client, wherein the TS correspondence is received from the client during a TS session;
classify, by a classifier, the TS correspondence to assign it a question classification, wherein the classifier classifies to the question classification, a statement classification, or a command classification using a natural language processing model;
store the TS correspondence in a question storage when the TS correspondence has the question classification;
based on the question classification, make a determination that the TS correspondence received during the TS session matches at least one prior received TS correspondence, wherein the at least one prior received TS correspondence is associated with the same TS session; and
visually identify the TS correspondence and the at least one prior received TS correspondence from the client on a graphical customer interface (GUI) of a technical support system, wherein the TS correspondence and the at least one prior received TS correspondence are highlighted to distinguish from other TS correspondences displayed in the GUI that do not match the at least one prior received TS correspondence;
receive a second TS correspondence from the client, wherein the second TS correspondence is associated with the TS session;
classify the second TS correspondence to assign it to a statement classification; and
based on the statement classification, not store the second TS correspondence in the question storage, wherein the question storage is used to train the classifier.

12. The non-transitory computer readable medium of claim 11, wherein the TS correspondence comprises text based on audio input obtained from the client.

13. The non-transitory computer readable medium of claim 11, wherein the TS correspondence comprises text obtained via a chat session from the client.

14. The non-transitory computer readable medium of claim 13,
wherein prior to classifying the TS correspondence, the text obtained via the chat session is cleaned to obtain cleaned TS correspondence, wherein classifying the TS correspondence uses the cleaned TS correspondence; and
wherein cleaning the TS correspondence comprises modifying at least a portion of the text to address at least one grammatical error.

* * * * *